(12) United States Patent
Tsoukatos et al.

(10) Patent No.: US 11,074,943 B2
(45) Date of Patent: Jul. 27, 2021

(54) METHODS AND DEVICES FOR ALLEVIATING THERMAL BOIL OFF IN IMMERSION-COOLED ELECTRONIC DEVICES

(71) Applicant: Seagate Technology LLC, Cupertino, CA (US)

(72) Inventors: Antonia Tsoukatos, Maple Grove, MN (US); John W. Dykes, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/680,265

(22) Filed: Nov. 11, 2019

(65) Prior Publication Data
US 2021/0142831 A1 May 13, 2021

(51) Int. Cl.
*G11B 33/14* (2006.01)
*G06F 1/20* (2006.01)

(52) U.S. Cl.
CPC .............. *G11B 33/144* (2013.01); *G06F 1/20* (2013.01); *G11B 33/1413* (2013.01)

(58) Field of Classification Search
CPC ....... G06F 1/16; G06F 1/1656; G11B 25/043; G11B 33/1466; G11B 33/027; G11B 33/022; G11B 33/1406; G11B 33/1446; G11B 33/14; G11B 33/1426; G11B 33/148; G11B 5/82
USPC ............................................ 361/679.33, 699
See application file for complete search history.

(56) References Cited

U.S. PATENT DOCUMENTS

| | | | |
|---|---|---|---|
| 4,245,668 A | 1/1981 | Lindstrom |
| 4,302,793 A | 11/1981 | Rohner |
| 5,297,621 A | 3/1994 | Taraci et al. |
| 6,019,167 A | 2/2000 | Bishop et al. |
| 7,724,517 B2 | 5/2010 | Attlesey et al. |
| 7,843,298 B2 | 11/2010 | Hosokawa et al. |
| 7,905,106 B2 | 3/2011 | Attlesey |
| 7,934,386 B2 | 5/2011 | Rummel et al. |
| 8,817,465 B2 | 8/2014 | Campbell et al. |
| 9,195,282 B2 | 11/2015 | Shelnutt et al. |
| 9,258,926 B2 | 2/2016 | Smith |
| 9,335,802 B2 | 5/2016 | Shelnutt et al. |
| 9,408,332 B2 | 8/2016 | Smith |
| 9,504,190 B2 | 11/2016 | Best |
| 9,560,789 B2 | 1/2017 | Smith |
| 9,622,376 B2 | 4/2017 | Mathew et al. |
| 9,699,939 B2 | 7/2017 | Smith |
| 9,756,766 B2 | 9/2017 | Best |

(Continued)

OTHER PUBLICATIONS

Tannaz Harirchian et al., "Boiling Heat Transfer and Flow Regimes in Microchannels—A Comprehensive Understanding", Journal of Electronic Packaging, Mar. 2011, vol. 133, pp: 011001-1-011001-10.

(Continued)

*Primary Examiner* — Mandeep S Buttar
(74) *Attorney, Agent, or Firm* — Faegre Drinker Biddle & Reath LLP

(57) ABSTRACT

A base deck for a data storage device includes a body. The body includes a bottom wall and sidewalls that create an internal cavity. The bottom wall includes a textured external surface opposite the internal cavity. The base deck can be coupled to a cover to seal the internal cavity.

19 Claims, 5 Drawing Sheets

(56) References Cited

U.S. PATENT DOCUMENTS

| | | | |
|---|---|---|---|
| 9,872,415 B2 | 1/2018 | Moss et al. | |
| 10,165,707 B1 | 12/2018 | Christiansen et al. | |
| 10,257,963 B2 | 4/2019 | Ozyalcin et al. | |
| 10,349,555 B2 | 7/2019 | Barragy et al. | |
| 2001/0024357 A1* | 9/2001 | Behl | G11B 33/128 |
| | | | 361/679.37 |
| 2002/0151799 A1 | 10/2002 | Pantages et al. | |
| 2004/0050491 A1 | 3/2004 | Miya et al. | |
| 2005/0057849 A1* | 3/2005 | Twogood | G11B 33/1446 |
| | | | 360/97.12 |
| 2007/0165385 A1* | 7/2007 | Park | H05K 1/0204 |
| | | | 361/748 |
| 2007/0213000 A1 | 9/2007 | Day | |
| 2007/0227710 A1 | 10/2007 | Belady et al. | |
| 2008/0017355 A1* | 1/2008 | Attlesey | H05K 7/20236 |
| | | | 165/104.33 |
| 2009/0268417 A1* | 10/2009 | Kagawa | G11B 5/4833 |
| | | | 361/752 |
| 2010/0027165 A1* | 2/2010 | Huang | G11B 25/043 |
| | | | 360/264 |
| 2011/0132579 A1 | 6/2011 | Best et al. | |
| 2013/0032217 A1 | 2/2013 | Pesek et al. | |
| 2014/0109610 A1 | 4/2014 | Wulf et al. | |
| 2014/0211412 A1 | 7/2014 | Best | |
| 2014/0218861 A1 | 8/2014 | Shelnutt et al. | |
| 2015/0013940 A1 | 1/2015 | Best et al. | |
| 2015/0062806 A1 | 3/2015 | Shelnutt et al. | |
| 2015/0070846 A1 | 3/2015 | Shelnutt et al. | |
| 2015/0302897 A1* | 10/2015 | Schudel | B24B 1/00 |
| | | | 360/99.18 |
| 2016/0234970 A1 | 8/2016 | Shelnutt et al. | |
| 2016/0240226 A1 | 8/2016 | Shelnutt et al. | |
| 2016/0330865 A1 | 11/2016 | Mathew et al. | |

OTHER PUBLICATIONS

Thien-Binh Nguyen et al., "Critical heat flux enhancement in pool boiling through increased rewetting on nanopillar array surfaces", Scientific Reports, Mar. 19, 2018, 9 pages.

* cited by examiner

METHODS AND DEVICES FOR ALLEVIATING THERMAL BOIL OFF IN IMMERSION-COOLED ELECTRONIC DEVICES

In certain embodiments, a base deck for a data storage device includes a body. The body includes a bottom wall and sidewalls that create an internal cavity. The bottom wall includes a textured external surface opposite the internal cavity.

In certain embodiments, a system includes a data storage system with an enclosure. The system also includes data storage devices positioned within the enclosure. The data storage devices include a body coupled to a cover, and the body includes a bottom wall and sidewalls that create an internal cavity. The bottom wall has a textured external surface opposite the internal cavity.

In certain embodiments, a method includes immersing a data storage device within a dielectric liquid. The data storage device includes a body with a textured external surface. The method further includes operating the data storage device while immersed in the dielectric liquid. The method further includes heating the dielectric liquid to a boiling temperature at a point adjacent to the textured external surface.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
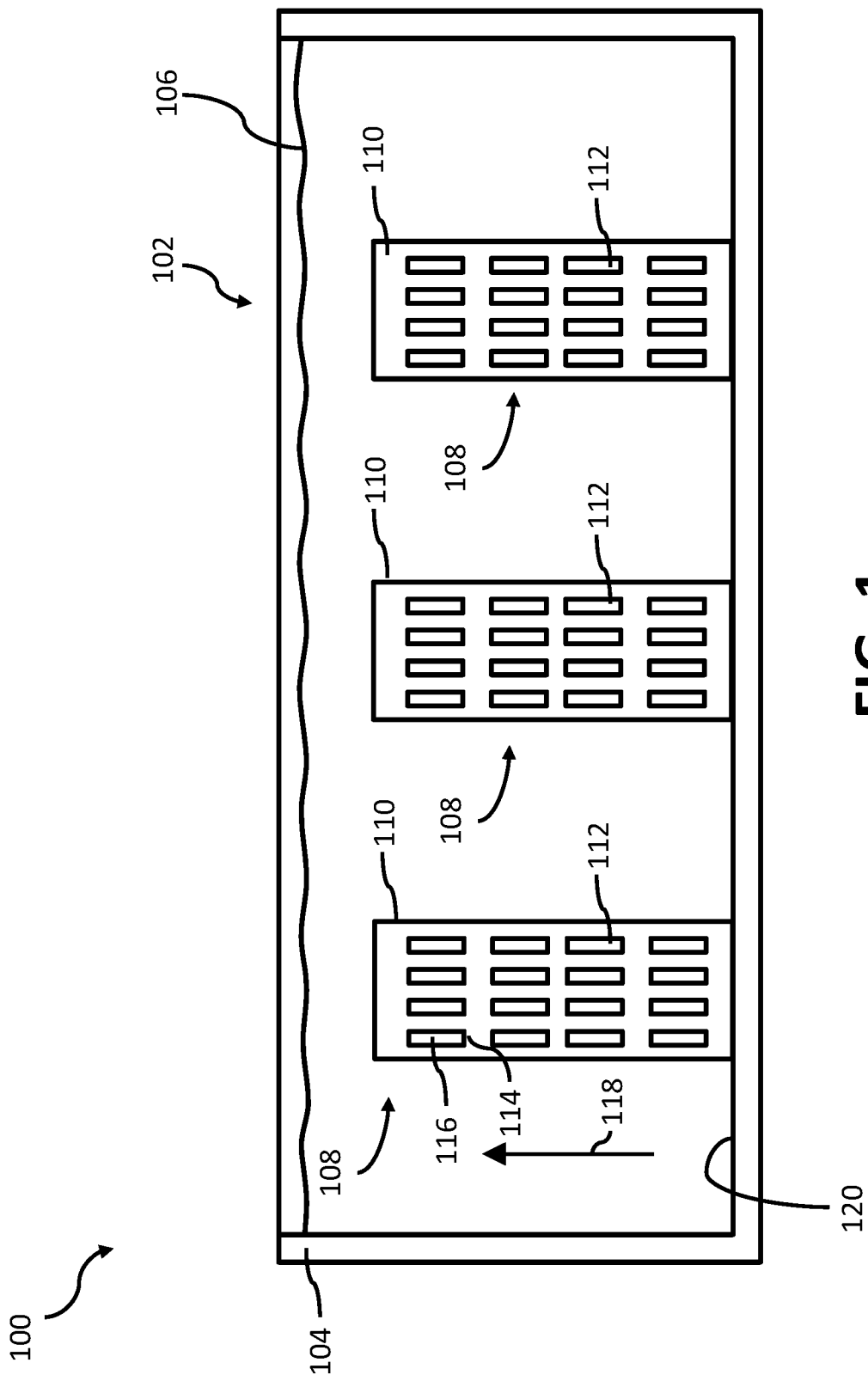
FIG. 1 shows a schematic of a cooling system and a data storage system, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Data storage systems are used to store and process vast amounts of data. It can be challenging to keep the systems and their components within a desired temperature range because of the amount of heat the systems typically generate during operation. For example, within data storage systems, the data storage devices themselves generate heat during operation as well as the power supply units that power the data storage devices. Data storage systems can include cooling devices such as fans that assist with keeping the systems within the desired temperature range during operation. However, fans generate acoustic energy that can induce unwanted vibration to the data storage devices. Further, fans can limit the density of data storage systems because the fans consume space that otherwise could be used for more data storage devices.

To alleviate the need for fans, data storage systems can be immersed in a dielectric liquid coolant in a tank. These liquid coolants help cool the heat-generating components (e.g., data storage devices and electrical components such as power supply units) of the data storage system without requiring fans and can reduce the amount of acoustic energy subjected to the data storage devices. However, when immersed in these liquids, data storage devices may generate enough heat at certain points (e.g., "hot spots") to cause the liquid to boil. The boiling at the hot spots creates bubbles that can accumulate. Formation of the bubbles can induce vibration to the data storage devices. Certain embodiments of the present disclosure accordingly feature systems, devices, and methods for reducing the effect of bubbles created in immersion data storage systems.

FIG. 1 shows a system 100 (e.g., an immersion data storage system) with a cooling system 102, which includes a tub or a tank 104 that is at least partially filled with a coolant 106 (e.g., a dielectric liquid coolant such as liquids comprising dodecafluoro-2-methylpentan-3-one or methoxy-nonafluorobutane). Data storage systems 108 (e.g., servers) are positioned and mounted in the tank 104 and fully (or at least partially) immersed in the coolant 106. Each data storage system 108 can include a rack 110 that stores data storage devices 112 (e.g., hard disk drives, solid state drives) and electrical components (e.g., power supply units, integrated circuits).

During operation, the data storage devices 112 and electrical components are powered and generate heat. The coolant 106 is pumped through the tank 104 and is heated by the data storage devices 112 and electrical components. The heated coolant 106 can be pumped through one or more pipes and heat exchangers (not shown) external to the tank 104 to be cooled and then pumped back into the tank 104. In other embodiments, one or more heat exchangers are positioned within the tank 104 and a lower-temperature liquid is pumped through the one or more heat exchangers.

The data storage devices 112 include sidewalls 114 and a bottom surface 116 and are shown in FIG. 1 as being arranged such that the data storage devices 112 rest on the sidewalls. This arrangement is sometimes referred to as a tombstone arrangement. Further, in this arrangement, the bottom surface 116 of the data storage devices 112 is parallel with a direction (represented by arrow and reference number 118 in FIG. 1) that is perpendicular to a bottom floor 120 of the tank 104. As will be described in more detail below, in this arrangement, bubbles created near the bottom surface 116 of the data storage devices 112 can more quickly detach and float away from the data storage devices 112 which reduces the negative effects of the bubbles.

Figure 2:
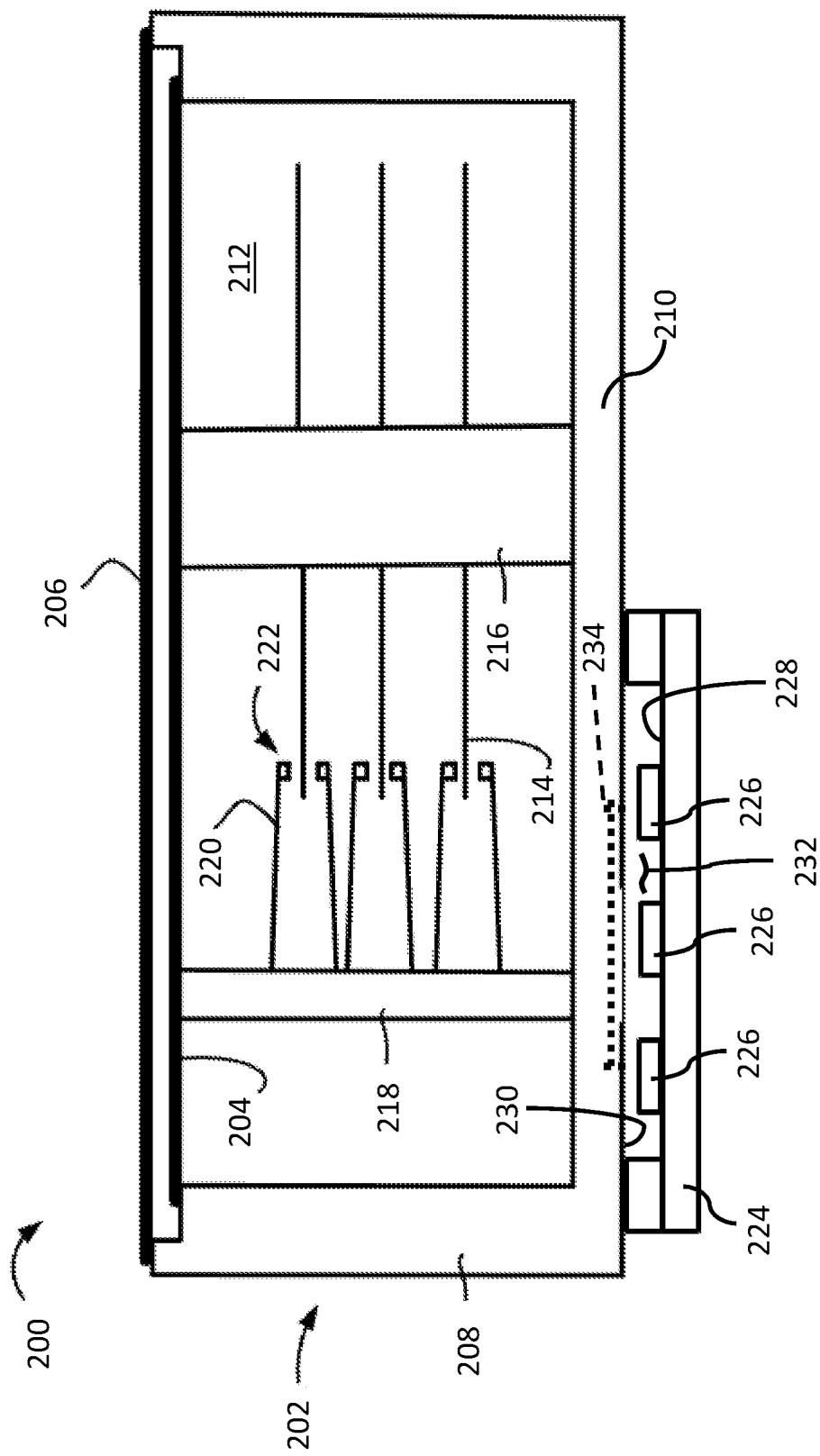
FIG. 2 shows a side, cut-away view of a hard disk drive, in accordance with certain embodiments of the present disclosure.
Figure 3:
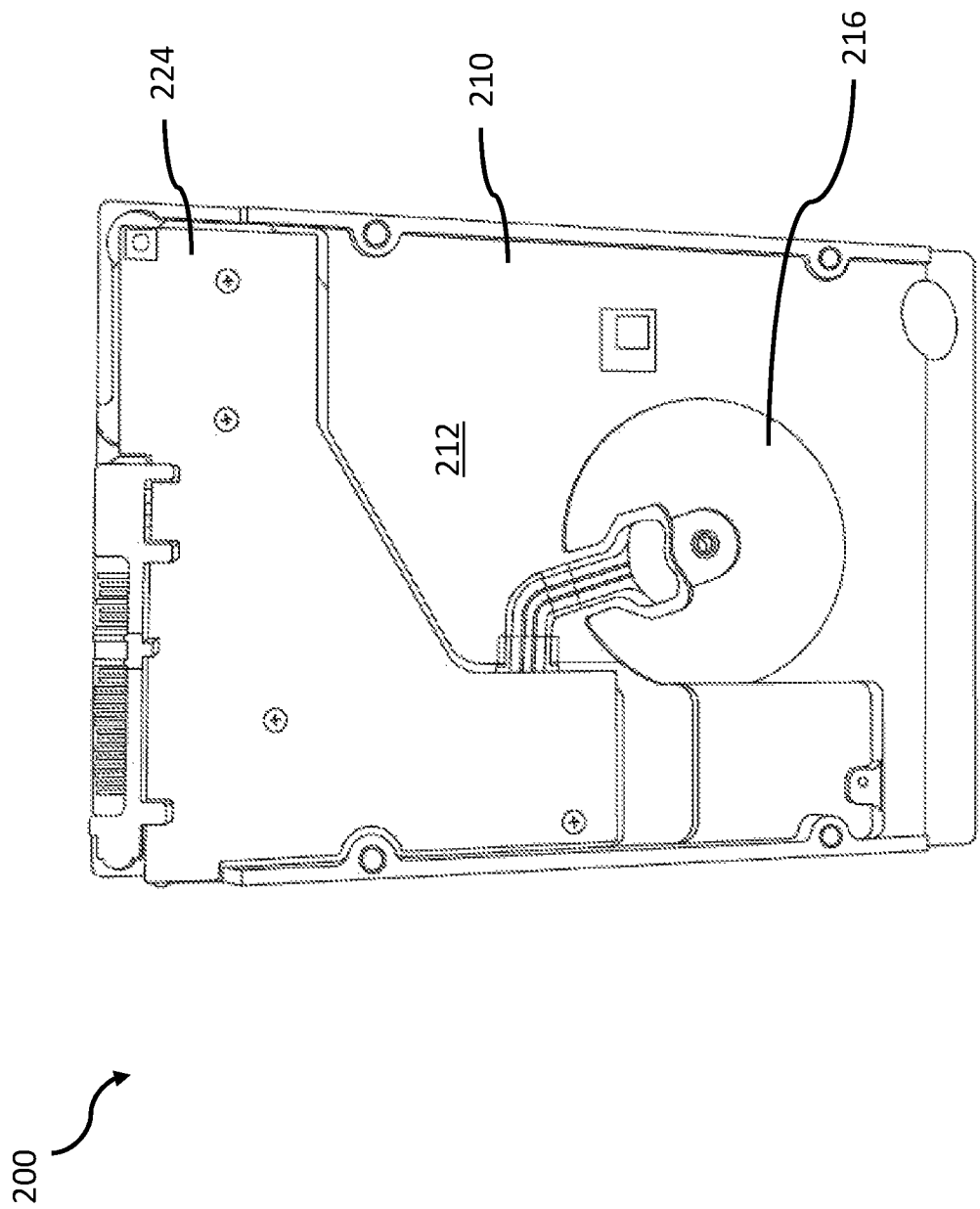
FIG. 3 shows a bottom view of the hard disk drive of FIG. 2 with a printed circuit board assembly attached, in accordance with certain embodiments of the present disclosure.
Figure 4:
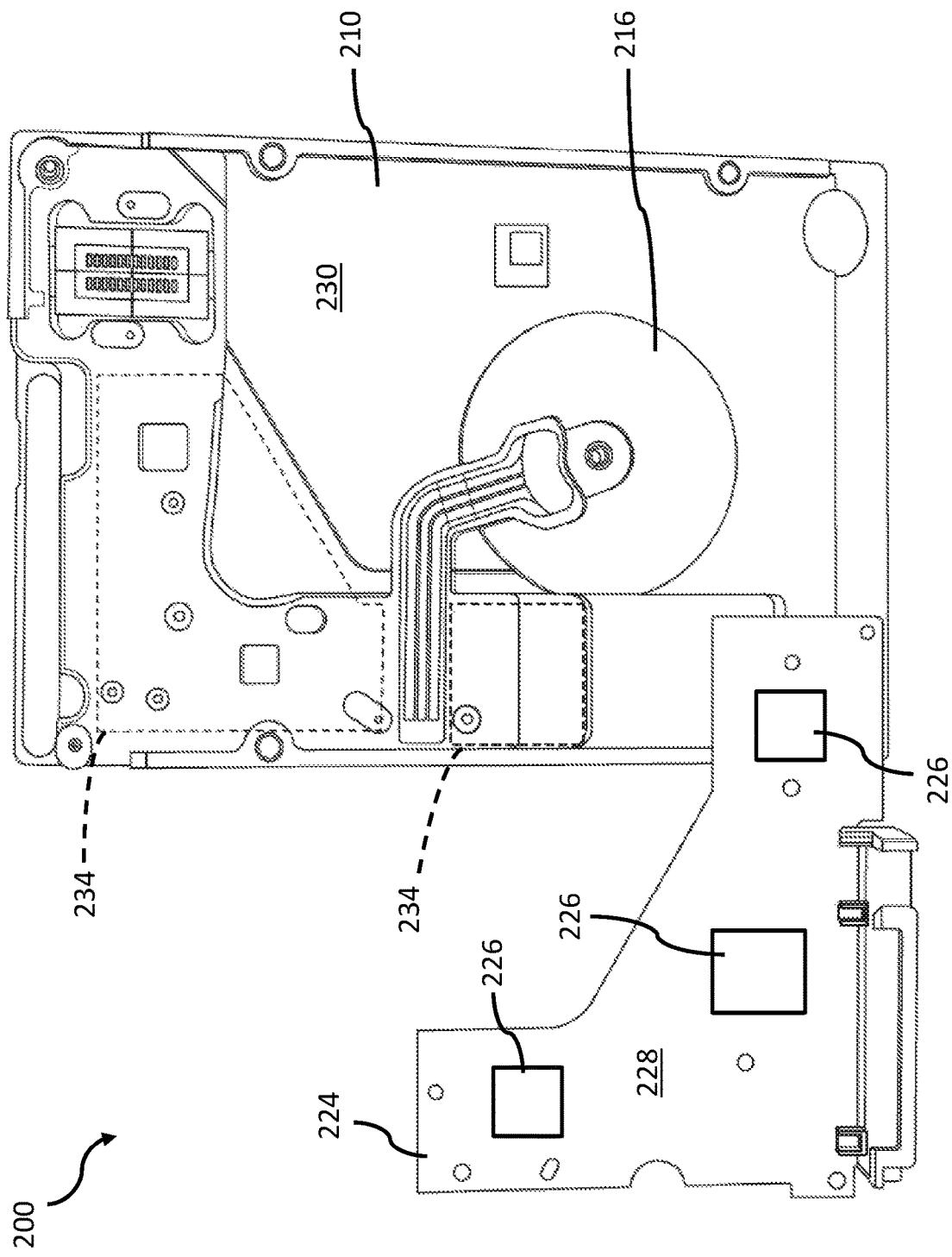
FIG. 4 shows a bottom view of the hard disk drive with a printed circuit board assembly of FIG. 3 detached, in accordance with certain embodiments of the present disclosure.

As mentioned above, the data storage systems 100 can include data storage devices 112 such as hard disk drives. FIG. 2 shows a cut away schematic of a hard disk drive 200, FIG. 3 shows a bottom view of the hard disk drive 200, and FIG. 4 shows a bottom view of the hard disk drive 200 partially unassembled.

The hard disk drive 200 includes a base deck 202, a process cover 204, and a final cover 206. The base deck 202 includes side walls (e.g., side wall 208) that, together with a bottom portion 210 of the base deck 202 and the process cover 204, creates an internal cavity 212 that may house data storage components like magnetic recording media 214, a spindle motor 216, an actuator pivot 218, suspensions 220, and read/write heads 222. In certain embodiments, the base deck comprises an aluminum alloy. The spindle motor 216 and the actuator pivot 218 are shown in FIG. 2 as being coupled between the process cover 204 and the bottom portion 210 of the base deck 202.

During assembly, the process cover 204 can be coupled to the base deck 202 by removable fasteners (not shown) and a gasket (not shown) to seal a target gas (e.g., air with nitrogen and oxygen and/or a lower-density gas like helium) within the internal cavity 212. Once the process cover 204 is coupled to the base deck 202, a target gas may be injected into the internal cavity 212 through an aperture in the process cover 204, which is subsequently sealed. Injecting the target gas, such as a combination of air and a low-density gas like helium (e.g., 90 percent or greater helium), may involve first evacuating existing gas from the internal cavity 212 using a vacuum and then injecting the target gas from a low-density gas supply reservoir into the internal cavity 212. The aperture can be sealed (by applying a seal, welding, or the like) to keep the target gas within the hard disk drive 200 and, in particular, the internal cavity 212.

Once the process cover 204 is sealed, the hard disk drive 200 can be subjected to a variety of processes and tests. Example processes and tests include those that establish performance parameters of the hard disk drive 200 (e.g., fly-height parameters), that identify and map flaws on the magnetic recording media 214, that write servo and data patterns on the magnetic recording media 214, and that determine whether the hard disk drive 200 is suitable for commercial sale. After the hard disk drive 200 is processed and passes certain tests, the internal cavity 212 may be refilled with the target gas and then resealed. Before the final cover 206 is installed, the pressure of the target gas within the internal cavity 212 may be checked to confirm the pressure is acceptable.

As mentioned above, when data storage devices such as hard disk drives are immersed in a dielectric liquid coolant, the data storage devices can generate enough heat at certain points to cause the liquid coolant to boil. Boiling creates bubbles in the liquid coolant. And as the bubbles form, bubbles can create a shock-like event that induces vibration to the data storage devices. Further, small bubbles can conglomerate into larger bubbles, which may cause a larger shock-like event than smaller bubbles.

To discourage growth of bubbles and conglomeration of smaller bubble into larger bubbles near the hot spots, certain data storage devices 112 (e.g., the hard disk drive 200 of FIGS. 2-4) can include one or more textured surfaces at or near where hot spots (and therefore bubbles) are likely to form. As will be described in more detail below, textured surfaces can discourage the growth and conglomeration of bubbles. Instead, the textured surfaces can encourage propagation rather than nucleation.

FIGS. 2 and 3 show the hard disk drive 200 coupled to a printed circuit board 224. The printed circuit board 224 includes one or more integrated circuits or chips 226 (shown in FIGS. 2 and 4). As shown in FIG. 2, the chips 226 are positioned on a surface 228 of the printed circuit board 224 that faces a bottom surface 230 of the base deck 202. During operation of the hard disk drive 200, the chips 226 are powered on to carry out various operations of the hard disk drive 200. For example, the chips 226 can include a system-on-a-chip (SOC) that includes firmware and various microprocessors that manage operations of the hard disk drive 200. These chips 226 generate heat in a concentrated space 232 (shown in FIG. 2) between the printed circuit board 224 and the base deck 202. Hot spots can form in this space 232 and cause the liquid coolant to boil and create bubbles. For example, liquid coolants can have boil-off temperatures in the range of 22° C.-75° C., which the liquid coolant 106 may reach in the space 232 between the printed circuit board 224 and the base deck 202.

As the bubbles form and travel within the limited space between the printed circuit board 224 and the base deck 202, the bubbles can induce vibration to the hard disk drive 200. This vibration can negatively affect the performance of the hard disk drive 200. For example, vibration can make it challenging to accurately position the read/write heads 222 over the desired data tracks on the magnetic recording media 214.

To help mitigate the negative effects of the boiling liquid coolant, the hard disk drive 200 can include one or more textured surfaces 234 (shown in FIGS. 2 and 4-6) in areas of the base deck 202. The areas with the textured surfaces 234 are represented in FIGS. 2 and 4 by dashed lines. The particular size and location of the areas with the textured surfaces 234 can vary depending on, for example, the likely locations of hot spots for a particular hard disk drive design or the positions of other components interfering with the ability to texture the bottom surface 230 of the base deck 202. The areas of the base deck 202 without the textured surfaces 234 can be considered to be smooth or less rough than the textured surfaces 234. As such, the bottom surface 230 of the base deck 202 can be considered to have portions covered by a smooth surface (or a less rough surface) and other portions with the textured surfaces 234. Further, the area with the textured surfaces 234 can be considered to be rougher or more textured than other components of the hard disk drive 200 such as the process cover 204 or the final cover 206.

The textured surfaces 234 can discourage conglomeration of larger bubbles and can direct bubbles away from the hard disk drive 200. Put another way, the textured surfaces 234 can encourage propagation of bubbles rather than nucleation. In particular, textured surfaces 234 can enable management of the size in developing boil-off bubbles by limiting nucleation growth and release frequency. Further, the textured surfaces 234 can enhance cooling efficiency by increasing critical heat enhancement at the base deck-to-liquid interface.

When the hard disk drive 200 is assembled, the areas with the textured surface 234 are at least partially covered by the printed circuit board 224. For example, FIG. 3 shows the printed circuit board 224 assembled to the base deck 202 such that the textured surfaces 234 are completely covered by the printed circuit board 224.

Figure 5:
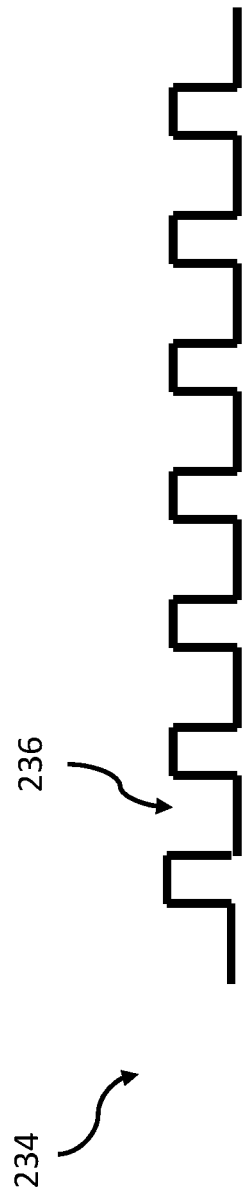
FIG. 5 shows a side view of channels that could be formed on the hard disk drive of FIGS. 2-4, in accordance with certain embodiments of the present disclosure.
Figure 6:
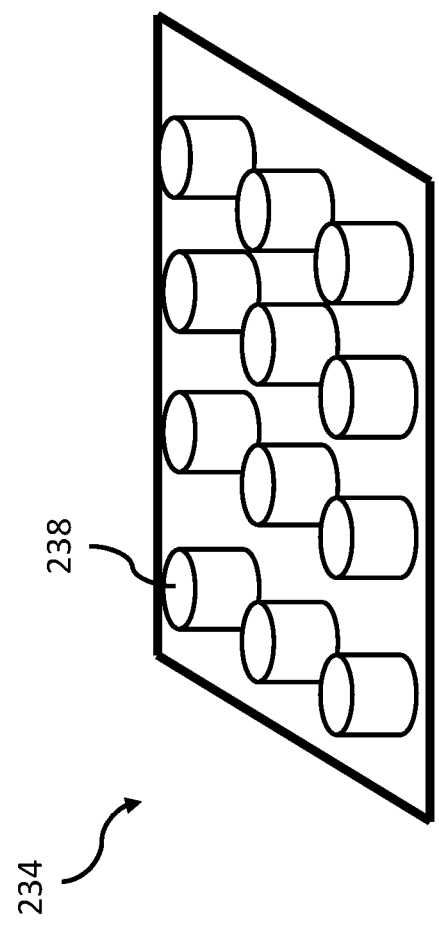
FIG. 6 shows a perspective view of pillars that could be formed on the hard disk drive of FIGS. 2-4, in accordance with certain embodiments of the present disclosure.

FIGS. 5 and 6 show zoomed-in views of example textured surfaces 234. FIG. 5 shows the textured surface 234 being formed by channels 236, and FIG. 6 shows the textured surface 234 being formed by an array or pillars 238.

It has been found that bubbles formed on smooth surfaces tend to merge and create either large bubbles or vapor columns beginning at the smooth surface, while bubbles formed on textured surfaces are less likely to merge. Further, textured surfaces encourage bubbles to detach from the surface quicker than smooth surfaces and results in less nucleation of bubbles on the textured surfaces compared to smooth surfaces. As such, the channels 236 and pillars 238 are sized to promote propagation rather than nucleation of bubbles created by the liquid coolant boiling. In certain embodiments, the channels 236 have a depth and are spaced from each other in the sub-millimeter range (e.g., on the order of hundreds or thousands of nanometers such as 100-5,000 nanometers, 500-2,000 nanometers, or 1,000-1,500 nanometers). Similarly, the pillars 238 can have heights and be spaced from each other in the sub-millimeter range.

The textured surfaces 234 on the base deck 202 can be created by a variety of processes. In certain embodiments, the textured surfaces 234 are created by etching processes (e.g., ion etching processes, chemical etching processes). For example, chemical etching can be used to create controlled etch indentations for the textured surfaces 234.

As noted above, as the bubbles form and travel within the limited space 232 between the printed circuit board 224 and the base deck 202, the bubbles can induce vibration to the hard disk drive 200 and negatively affect the performance of the hard disk drive 200. The textured surfaces 234 help reduce creation of larger bubbles and encourage detachment from the textured surfaces 234 quicker than smooth surfaces. To further reduce the negative effects of the bubbles, the hard disk drives 200 can be arranged within cooling systems (e.g., such as the cooling system 102 shown in FIG. 1) such that the bubbles can detach and quickly float away from the hard disk drives 200. As such, the hard disk drives 200 can be arranged in cooling systems such that, when the coolant liquid boils in the space 232 between the printed circuit board 224 and the base deck 202, the bubbles quickly escape from the space 232 and away from the base deck 202. As mentioned above, the hard disk drives 200 can be arranged in a tombstone arrangement.

Various methods can be used in connection with the systems shown and described herein. In certain embodiments, a method can include immersing a data storage device within a dielectric liquid. The data storage device can include a body with a textured external surface. The method can further include operating the data storage device while immersed in the dielectric liquid. Further, the method can include heating the dielectric liquid to a boiling temperature at a point adjacent to the textured external surface. In certain embodiments, the dielectric liquid is heated via an integrated circuit positioned on the data storage devices. In certain embodiments, the point adjacent to the textured external surface is positioned between a circuit board and the textured external surface of the body of the data storage device. In certain embodiments, the data storage device is one of many positioned in a larger data storage system such as a server immersed in the dielectric liquid.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. An apparatus comprising: a base deck for a data storage device, the base deck having a body that includes a bottom wall and sidewalls that create an internal cavity, the bottom wall including a textured external surface opposite the internal cavity; wherein the textured external surface is configured to resist coalescence of bubbles.

2. The apparatus of claim 1, wherein the textured external surface includes a plurality of channels.

3. The apparatus of claim 2, wherein the plurality of channels have a width and height less than one millimeter.

4. The apparatus of claim 1, further comprising:
a circuit board coupled to the body and arranged to at least partially cover the textured external surface.

5. The apparatus of claim 1, further comprising:
a circuit board coupled to the body and arranged to completely cover the textured external surface.

6. The apparatus of claim 1, wherein the bottom wall includes a non-textured surface opposite the internal cavity.

7. The apparatus of claim 1, further comprising:
a top cover coupled to the base deck; and
a spindle motor directly coupled to the base deck.

8. The apparatus of claim 1, wherein the textured surface includes channels have a depth of 100-5,000 nanometers.

9. The apparatus of claim 1, wherein the textured surface is an etched textured surface.

10. The apparatus of claim 1, wherein the data storage device is a hard disk drive.

11. The apparatus of claim 1, wherein the textured external surface has a roughness that is greater than other external surfaces of the base deck.

12. A system comprising: a data storage system including an enclosure; and data storage devices positioned within the enclosure, the data storage devices each including a base deck with body coupled to a cover, the body of each of the data storage devices including a bottom wall and sidewalls that create an internal cavity, the bottom wall including a textured external surface opposite the internal cavity, wherein each of the data storage devices includes a circuit board that is coupled to the body and that is arranged to at least partially cover the textured external surface; wherein the textured external surface is configured to resist coalescence of bubbles.

13. The system of claim 12, further comprising:
a cooling system including a tank, wherein the data storage system is positioned within the tank.

14. The system of claim 13, wherein the tank is at least partially filled with a coolant.

15. The system of claim 14, wherein the data storage system is at least partially immersed in the coolant.

16. The system of claim 13, wherein the each of the data storage devices is arranged such that the textured external surface is parallel with a direction perpendicular to a bottom wall of the tank.

17. A method comprising: immersing a data storage device within a dielectric liquid, the data storage device including a body with a textured external surface; operating the data storage device while immersed in the dielectric liquid; and heating the dielectric liquid to a boiling temperature at a point adjacent to the textured external surface; wherein the textured external surface is configured to resist coalescence of bubbles.

18. The method of claim 17, wherein the heating of the dielectric liquid includes heating the dielectric liquid via an integrated circuit positioned on the data storage devices.

19. The method of claim 17, wherein the point adjacent to the textured external surface is positioned between a circuit board and the textured external surface of the body of the data storage device.

* * * * *